United States Patent [19]
Kurimoto et al.

[11] Patent Number: 4,885,322
[45] Date of Patent: Dec. 5, 1989

[54] NOVEL AMMONIUM SALT USEFUL AS MODIFIERS FOR RUBBER

[75] Inventors: Isao Kurimoto, Toyonaka; Hiroki Yamamoto, Nishinomiya; Tetsuo Yamaguchi, Hirakata, all of Japan

[73] Assignee: Sumitomo Chemical Company, Limited, Osaka, Japan

[21] Appl. No.: 196,057

[22] Filed: May 19, 1988

[30] Foreign Application Priority Data

Sep. 22, 1987 [JP] Japan ................. 62-238190

[51] Int. Cl.⁴ .............................. L08K 5/19
[52] U.S. Cl. ........................ 524/82; 524/86; 524/107; 524/260; 525/376; 525/377; 525/378
[58] Field of Search ............. 524/260, 82, 86, 107; 525/377, 378, 376

[56] References Cited

U.S. PATENT DOCUMENTS 3,151,161  9/1964  Mullins et al. .
3,756,969  9/1973  Danielson .................... 525/377
4,698,446  10/1987  Lai et al. .

FOREIGN PATENT DOCUMENTS 2533365  1/1988  European Pat. Off. ........... 525/377
1330763  5/1963  France ....................... 524/260
58-118837  7/1983  Japan .
59-18740  1/1984  Japan .

OTHER PUBLICATIONS

Chemical Abstracts, vol. 99, No. 13, Sept. 26, 1983, p. 542, Abs. No. 104716.
Chemical Abstracts, vol. 90, No. 11, Mar. 12, 1979, p. 523, No. 86300R.

Primary Examiner—John C. Bleutge
Assistant Examiner—David W. Woodward
Attorney, Agent, or Firm—Stevens, Davis, Miller & Mosher

[57] ABSTRACT

An ammonium slat represented by the formula

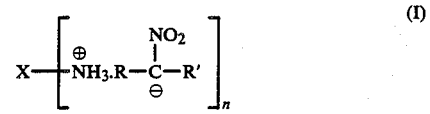

wherein X represents aliphatic group or alicyclic group, each of which may contain halogen, oxygen, nitrogen or sulfur in the group;
n is an integer of 1 or more; and R and R' each independently represent hydrogen or an alkyl having 1 to 12 carbon atoms, and may conjointly form a ring;
is useful as a modifier for rubber, particularly to improve dynamic properties of rubber. The process for producing the ammonium salt is also disclosed.

14 Claims, No Drawings

NOVEL AMMONIUM SALT USEFUL AS MODIFIERS FOR RUBBER

This invention relates to certain novel ammonium salts, to their use as modifiers for rubber, and to their production processes.

Recently, there have grown social demands for improving the rate of fuel consumption in tires of passenger cars and for extending running life in large size tires of motor trucks and buses. Thus, attention has been paid to chemicals for improving the dynamic properties of vulcanized rubber, such as for improving resilience and heat build-up.

Besides the addition of such dynamic property improvers, there are some known methods for improving dynamic properties of vulcanized rubber, such as improvements in, for example, microstructure or molecular weight distribution of rubber, and improvements in the compounding manner of organic rubber chemicals or fillers. The addition of dynamic property improvers, however, has some advantage in that it can easily improve the dynamic properties in comparison with the other methods and can be applied also to natural rubber.

There have been developed as the dynamic property improvers, for example, 8-hydroxyquinoline derivatives having particular structures as disclosed in Japanese Pat. Publication Kokai (A) 58-118837 and nitro compounds containing sulfur atoms disclosed in Japanese Pat. Publication Kokai (A) 59-18740.

However, both the 8-hydroxyquinoline derivatives and the sulfur-containing nitro compounds were, in spite of their excellent effects on improvements in dynamic properties, not entirely satisfactory due to their undesirable effects of markedly accelerating scorching or deteriorating flex cracking resistance.

In view of the above circumstances, the present inventors have made intensive investigations to develop compounds useful as modifiers for rubber having excellent characteristics in improving dynamic properties without the above defects, and found that particular ammonium salts are extremely useful as modifiers for vulcanized rubber, particularly as dynamic property improvers.

Thus, the present invention provides an ammonium salt represented by the formula (I)

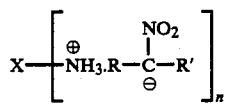 (I)

wherein X represents aliphatic group or alicyclic group, each of which may contain halogen, oxygen, nitrogen or sulfur in the group;
n is an integer of 1 or more; and
R and R' each independently represent hydrogen or an alkyl having 1 to 12 carbon atoms, and may conjointly form a ring.

The present invention also concerns the use of the above ammonium salt as a modifier for rubber.

The present invention further provides a process for producing the ammonium salt of the formula (I) by reacting a primary amine represented by the formula (II)

$$X(\text{-NH}_2)_n \quad (II)$$

wherein X and n have the same meanings as defined above, with a nitroalkane represented by the formula (III)

$$\underset{\underset{R-CH-R'}{|}}{NO_2} \quad (III)$$

wherein R and R' have the same meanings as defined above.

The ammonium salt of the present invention represented by the formula (I) can be produced by reacting the primary amine represented by the formula (II) with the nitroalkane represented by the formula (III). The reaction can be carried out by mixing the primary amine and the nitroalkane.

Typical examples of the primary amine represented by the formula (II) usable in the present invention include the following:

monoamines such as methylamine, ethylamine, 1-aminobutane, 2-aminobutane, 1-aminooctane, 1-aminododecane and cyclohexylamine;

diamines such as ethylenediamine, 1, 4-diamino butane, 1,6-diaminohexane, 1, 8-diaminooctane, 1, 10-diaminodecane, 1, 12-diaminododecane and 1, 4-diaminocyclohexane;

triamines including triaminotrialkylamines such as 2, 2',2''-triaminotriethylamine;

halogenoalkylamines such as 2-chloroethylamine and 2-bromoethylamine;

oxygen-containing amines such as ethanolamine, 2-amino-1-propanol, 2-methoxyethylamine, 2-amino-1-butanol, 2-amino-2-methyl-1-propanol, 3-methoxypropylamine, 6-amino-1-hexanol and 2-aminocyclohexanol;

aminothiols such as 2-aminoethanethiol; and the like.

As is clear from the above examples, X in the primary amine of the formula (II) can be various types of groups, and its number of carbon atoms or the like are not limited in principle. Preferable X is aliphatic group having 1 to 18 carbon atoms or alicyclic group having 3 to 18 carbon atoms. Among them, the aliphatic group, particularly those having 4 to 12 carbon atoms, are more preferred. Of course, these X's can contain halogen, oxygen, nitrogen or sulfur. These X's will correspond to the X's in the objective ammonium salts of the formula (I).

The number of primary amino groups, n, in the primary amine (II) can also vary to a considerable extent. For example, it will be possible to use the primary amine in which n is around 20 or more, but normally it will be sufficient to use one in which n is 10 or less, and preferably one in which n is 6 or less, and more preferably one in which n is 1 to 3. In general, n in the starting primary amine of the formula (II) will be the same number as n in the objective ammonium salt of the formula (I).

Typical examples of the nitroalkane represented by the formula (III) usable in the present invention include nitromethane, nitroethane, 1-nitropropane, 2-nitropropane, 2-nitrobutane, 2-nitrooctane, nitrocyclohexane, 1-nitrododecane, 2-nitrododecane and the like.

As is clear from the above examples, R and R' in the nitroalkane of the formula (III) can vary within the scope of hydrogen, an alkyl having 1 to 12 carbon atoms or a group in which R and R' conjointly form a ring.

Preferable one for R and R' is hydrogen or an alkyl having 1 to 6 carbon atoms. These R and R' will correspond to those in the objective ammonium salt of the formula (I).

The weight ratio between the primary amine represented by the formula (II) and the nitroalkane represented by the formula (III) is not particularly limited in the reaction of the present invention, but it is preferable to use the nitroalkane in an amount of about equimolar or more to the primary amino group in the primary amine. Especially, when the primary amine is a polyamine having 2 or more primary amino groups in the molecule, and the nitroalkane is used in an amount less than equimolar to the primary amino group in the primary amine, compounds having unreacted primary amino group will be formed to decrease the reaction yield of the desired ammonium salt represented by the formula (I).

In this reaction, when the nitroalkane is used in excess of the required amount, the surplus can be a solvent. On the other hand, one is also allowed to use a solvent such as lower alcohols. The lower alcohols usable as the solvent include, for example, methanol, ethanol and isopropyl alcohol.

Reaction temperature is preferably in a range of from about 0° C to about 100° C, more preferably from about 20° C to about 60° C. Reaction time varies depending on the kind of starting compound or the like, and is not limited to a specific range, but the reaction is usually completed within 2 hours.

After completion of the reaction, the reaction mixture is cooled to a temperature of from about 0° C to about 10° C, the precipitated crystals are collected on a filter and then dried to obtain a desired product.

The ammonium salt of the formula (I) thus obtained is quite useful as a modifier for rubber, particularly as a dynamic property improver for vulcanized rubber. When it is used as a modifier for rubber, the ammonium salt may be used alone, or by mixing with common carriers which will not affect the rubber properties.

Next, the method of using the modifier for rubber, namely the compounding method of rubber compositions, will be explained hereunder.

The modifier for rubber containing the ammonium salt represented by the formula (I) as an active ingredient can be incorporated into natural rubber or synthetic rubber, together with a filler and other additives which are usually used in rubber industries. The rubbers applicable in the present invention include natural rubber and various kinds of synthetic rubber such as polyisoprene rubber (IR), styrene-butadiene copolymer rubber (SBR), polybutadiene rubber (BR), acrylonitrile-butadiene copolymer rubber (NBR), isoprene-isobutylene copolymer rubber (IIR) and ethylene-propylene-diene copolymer rubber (EPDM), among which highly unsaturated rubber is preferably used.

As for the filler, it includes, for example, carbon black, silica, talc and clay, all of which are normally used in the rubber industry. Among these fillers, carbon black is preferably used in the present invention. The compounding ratio of the filler can be similar to conventional use, and is not critically specified in the present invention.

As for other additives, there are process oil, stearic acid, vulcanizing agent, vulcanization accelerator and so forth. These additives are preferably used also in the present invention as in the conventional manner.

According to the present invention, rubber is blended with the ammonium salt represented by the formula (I), preferably along with the above filler and other additives. The amount of the ammonium salt is not critical for compounding a rubber composition. However, if the amount is too small, it exhibits only unsatisfactory improving effect on the dynamic properties. If it is too great, the effect is to be uneconomical. Therefore, it is preferable to use the ammonium salt in a proportion of from about 0.1 to about 10 parts by weight per 100 parts by weight of the rubber.

In general, when compounding ingredients are incorporated into natural rubber or synthetic rubber, the compounding is, in principle, carried out by two steps. That is, a filler, process oil, stearic acid or the like are incorporated in the first step at a relatively high rubber temperature of from about 120° C to about 200° C, while a vulcanization accelerator and a vulcanizing agent are incorporated in the second step at a relatively low rubber temperature of from about 30° C to about 120° C.

When the ammonium salt of the present invention represented by the formula (I) is incorporated into rubber, this can be carried out in any step. Therefore, it may be incorporated together with the vulcanization accelerator and vulcanizing agent in the second step at relatively low temperature, but is preferably incorporated in the first step at relatively high temperature when the filler and the like are incorporated. At this stage, a vulcanization accelerator and/or a vulcanizing agent such as dimorpholinodisulfide may be additionally used as auxiliary agents in a small amount in order to further improve the effect.

When the ammonium salt of the present invention and the filler such as carbon black are incorporated into the rubber, its torque will sometimes tend to increase. In order to remedy such phenomenon, a peptizer or a retarder may be used at the same time. Further, a variety of usual rubber chemicals, a softener and the like may of course be used, if necessary.

According to the present invention, a novel ammonium salt useful as a modifier for rubber is provided. This ammonium salt or modifier will contribute to the production of such chemicals particularly on an industrial scale, because its production is easier than conventional modifiers such as dynamic property improvers.

The modifier containing the above ammonium salt as an active ingredient has excellent efficiency to improve the dynamic properties of rubber such as resilience and heat build-up, when it is incorporated into vulcanized rubber including natural rubber or synthetic rubber. Further, the compounded rubber containing the above modifier is also improved in flex cracking resistance which has been a contrary characteristic to the improvement of dynamic properties in the conventional technology. At the same time, scorching is not so markedly accelerated in comparison with the rubber containing a conventional modifier, and is near to the one containing no such modifier.

Because of these characteristics, the modifier for rubber according to the present invention can be applied not only to the rubber for treads of various sorts of tires but also to the rubber for other parts of tires. It may be further employed effectively in industrial equipment such as antivibration rubber and the like. Therefore, it is extensively valuable in industrial uses.

The following examples will illustrate the present invention in more detail, but do not restrict the present invention.

Table 1 shows melting points and elemental analysis results of the obtained compounds.

TABLE 1

| | | Prepared ammonium salt | | | | | | | |
|---|---|---|---|---|---|---|---|---|---|
| Example | Starting primary amine | Abbreviation | Name of compound | Yield (g) | Melting point (°C.) | Elemental analysis (%) | | | |
| 2 | 1-Amino-butane | B | 1-Butyl-ammonium 2-nitropropan-2-ide | 159 | 23–25 | | $(C_7H_{18}N_2O_2)$ | | |
| | | | | | | | C | H | N |
| | | | | | | Found: | 51.63 | 11.27 | 17.51 |
| | | | | | | Calculated: | 51.82 | 11.18 | 17.27 |
| 3 | 1-Amino-dodecane | C | 1-Dodecyl-ammonium 2-nitropropan-2-ide | 270 | 67–70 | | $(C_{15}H_{34}N_2O_2)$ | | |
| | | | | | | | C | H | N |
| | | | | | | Found: | 65.37 | 12.27 | 9.99 |
| | | | | | | Calculated: | 65.65 | 12.49 | 10.21 |
| 4 | Cyclo-hexyl-amine | D | Cyclohexyl-ammonium 2-nitropropan-2-ide | 185 | 33–35 | | $(C_9H_{20}N_2O_2)$ | | |
| | | | | | | | C | H | N |
| | | | | | | Found: | 57.03 | 14.50 | 10.79 |
| | | | | | | Calculated: | 57.41 | 14.88 | 10.71 |

EXAMPLE 1

Into a flask, 129 g (1.0 mole) of 1-aminooctane and 100 ml of methanol were charged, and then 89 g (1.0 mole) of 2-nitropropane were dropped into the flask maintained at about 40° C over a period of about 30 minutes. After that, upon maintaining the mixture at the same temperature for 30 minutes, crystals were precipitated to give slurry. The reaction mixture was cooled to a temperature of 5° C and then filtered. The filtered precipitates were washed with 30 ml of cold methanol and dried under reduced pressure to obtain 213 g of 1-octylammonium 2-nitropropan-2-ide with a yield of 97.7%.

The compound was in a state of pale brown crystals having a melting point of 30° –32° C. The compound will be referred to as compound A hereinafter.

An elemental analysis result of the compound was as follows:

| | C | H | N |
|---|---|---|---|
| Found | 60.80% | 11.88% | 13.01% |
| Calculated | 60.51% | 12.00% | 12.83% |

The compound was confirmed to be an ammonium salt by the following assignment of IR spectra:
stretching vibration of 3,100 — 2,600 $cm^{-6}$ for $NH_3^+$; and
combination vibration (asymmetric deformation, torsion) of 2,200 $cm^{-1}$ for $NH_3^+$.

EXAMPLES 2–4

1-Aminobutane, 1-aminododecane and cyclohexylamine were used in an amount of 1.0 mole respectively instead of the 1-aminooctane in Example 1 as starting primary amines, and the other reaction operations were repeated in the same manner as in Example 1 to produce other monoammonium salts.

EXAMPLE 5

Into a flask, 116 g (1.0 mole) of 1, 6-diaminohexane, 178 g (2.0 moles) of 2-nitropropane and 180 ml of methanol were charged. Upon stirring them at room temperature for 1 hour, white crystals were precipitated to give slurry. The reaction was exothermic and the liquid temperature rose to the maximum of 45° C. After completion of the reaction, the reaction mixture was cooled to 5° C and then filtered. The filtered precipitates were washed with 50 ml of cold methanol and dried under reduced pressure to obtain 290 g of 1, 6-hexanediammonium bis(2-nitropropan-2-ide) with a yield of 98.6%.

The compound was in a state of white crystals having a melting point of 86° - 87° C. The compound will be referred to as compound E hereinafter.

An elemental analysis result of the compound was as follows:

| | C | H | N |
|---|---|---|---|
| Found | 48.75% | 10.42% | 18.97% |
| Calculated | 48.96% | 10.27% | 19.03% |

The compound was confirmed to be an ammonium salt by the following assignment of IR spectra:
stretching vibration of 3,100 - 2,600 —2,600 $cm^{-1}$ for $NH_3^+$; and
combination vibration (asymmetric deformation, torsion) of 2,190 $cm^{-1}$ for $NH_3^+$.

Examples 6 - 8

Ethylenediamine, 1, 4-diaminobutane and 1, 12-diaminododecane were used in an amount of 1.0 mole respectively instead of the 1, 6-diaminohexane in Example 5 as starting primary amines, and the other reaction operations were repeated in the same manner as in Example 5 to produce other diammonium salts.

Table 2 shows melting points and elemental analysis results of the obtained compounds.

TABLE 2

| | | Prepared ammonium salt | | | | |
|---|---|---|---|---|---|---|
| Example | Starting primary amine | Abbreviation | Name of compound | Yield (g) | Melting point (°C.) | Elemental analysis (%) |
| | | | | | | $(C_8H_{22}N_4O_4)$ |

TABLE 2-continued

| Example | Starting primary amine | Abbreviation | Name of compound | Yield (g) | Melting point (°C) | Elemental analysis (%) | | | |
|---|---|---|---|---|---|---|---|---|---|
| | | | | | | | C | H | N |
| 6 | Ethylenediamine | F | 1,2-Ethanediammonium bis(2-nitropropan-2-ide) | 232 | 25–28 | Found: Calculated: ($C_{10}H_{26}N_4O_4$) | 41.18 40.32 | 9.29 9.31 | 23.25 23.51 |
| 7 | 1,4-Diaminobutane | G | 1,4-Butanediammonium bis(2-nitropropan-2-ide) | 263 | 55–57 | Found: Calculated: ($C_{18}H_{42}N_4O_4$) | 45.23 45.10 | 9.92 9.84 | 20.88 21.04 |
| 8 | 1,12-Diaminododecane | H | 1,12-Dodecanediammonium bis(2-nitropropan-2-ide) | 375 | 109–111 | Found: Calculated: | 57.01 57.11 | 11.33 11.18 | 14.56 14.80 |

EXAMPLES 9 – 11

Nitroethane, 1-nitropropane and nitrocyclohexane were used in an amount of 2.0 moles respectively instead of the 2-nitropropane in Example 5 as starting nitroalkanes, and the other reaction operations were repeated in the same manner as in Example 5 to produce other diammonium salts.

Table 3 shows melting points and elemental analysis results of the obtained compounds.

TABLE 3

| Example | Starting nitroalkane | Abbreviation | Name of compound | Yield (g) | Melting point (°C) | Elemental analysis (%) | | | |
|---|---|---|---|---|---|---|---|---|---|
| | | | | | | | C | H | N |
| 9 | Nitroethane | I | 1,6-Hexanediammonium bis(nitroethan-1-ide) | 263 | 72–74 | ($C_{10}H_{26}N_4O_4$) Found: Calculated: | 44.88 45.10 | 9.92 9.83 | 20.87 21.04 |
| 10 | Nitropropane | J | 1,6-Hexanediammonium bis(1-nitropropane-1-ide) | 289 | 81–83 | ($C_{12}H_{30}N_4O_4$) Found: Calculated: | 48.59 48.96 | 10.38 10.27 | 18.85 19.03 |
| 11 | Nitrocyclohexane | K | 1,6-Hexanediammonium bis(nitrocyclohexan-1-ide) | 369 | 108–110 | ($C_{18}H_{38}N_4O_4$) Found: Calculated: | 57.66 57.73 | 10.42 10.23 | 15.10 14.96 |

Example 12

Into a flask, 14.6 g (0.1 mole) of 2,2',2''-tri-aminotriethylamine and 10 ml of methanol were charged, and then 26.7 g (0.3 mole) of 2-nitropropane were dropped into the flask maintained at about 40° C over a period of about 30 minutes. After that, upon maintaining the mixture at the same temperature for 1 hour, white crystals were precipitated to give slurry. The reaction mixture was cooled to a temperature of 0° C and then filtered. The filtered precipitates were washed with 10 ml of cold methanol and dried under reduced pressure to obtain 40.3 g of triethylamine-2,2',2''-triammonium tris(2-nitropropan-2-ide) with a yield of 97.6%.

The compound was in a state of white crystals having a melting point of 39°–41° C. The compound will be referred to as compound L hereinafter.

An elemental analysis result of the compound was as follows:

| | C | H | N |
|---|---|---|---|
| Found | 43.68% | 9.48% | 23.65% |
| Calculated | 43.57% | 9.50% | 23.71% |

EXAMPLE 13

The compounds A to L thus obtained in Examples 1 to 12 were incorporated into natural rubber in accordance with the recipe for compounding listed below to conduct various tests for evaluating the physical properties of the compounded rubber. For comparison, the same tests were also conducted for the rubber blended with 7? (dimethyldithiocarbamoylmethyl)? 8? hydroxyquinoline (abbreviated as DTHQ) which had been disclosed in Japanese Pat. Publication Kokai (A) 58? 118837, the rubber blended with a resinous material obtained by reacting N? (1? methyl2-nitropropyl) aniline with sulfur monochloride in a molar ratio of 1 : 1 (abbreviated as MNDS) which had been disclosed in Japanese Pat. Publication Kokai (A) 59? 18740, and the rubber blended with no such compound.

| Recipe for compounding | |
|---|---|
| Natural Rubber (RSS #1) | 100 parts by weight |
| HAF Black | 45 parts by weight |
| Stearic Acid | 3 parts by weight |
| Aromatic Process Oil | 3 parts by weight |

| Recipe for compounding | |
| --- | --- |
| Zinc Oxide | 5 parts by weight |
| Vulcanization Accelerator (N—Cyclohexyl-2-benzo-thiazolylsulfenamide) | 1 part by weight |
| Sulfur | 2 parts by weight |
| Modifying Compound (Ammonium salt of the present invention or comparative compound) | Shown in Table 4 |

At the compounding, LABOPLASTOMILL ® with a capacity of 250 ml, manufactured by TOYO SEIKI CO., LTD., was used as a Bumbury's Mixer. First of all, the basal natural rubber was mixed with the carbon black, zinc oxide, process oil, stearic acid and modifying compound listed in the above recipe at an oil bath temperature of 170° C. The mixture was then kneaded for 5 minutes with mixer revolutions of 60 rpm. The rubber temperature was 150°-160° C at the kneading. Next, the blend was transferred on an open mill and kneaded while adding thereto the vulcanization accelerator and sulfur listed in the above recipe at a temperature of 40°-50° C. The blend was then vulcanized by using a vulcanizing press at a temperature of 145° C. for 20 minutes to form a predetermined shape. The formed vulcanizates were provided for various tests.

The following were methods for the various tests:

(1) Mooney Scorching

Scorch time was determined by measuring the time for increasing the scorching by 5 points from the lowest value at 125° C, in accordance with JIS K 6300. However, SBR in below-mentioned Example 14 was tested at 135° C.

(2) Tensile Property and Resilience

A tensile test was conducted in accordance with JIS K 6301. Tensile stress ($M_{300}$) was measured by using a No. 5 type ring. Resilience was measured by using a Lüpke type tester.

(3) Heat Build-up Resistance

A test was conducted in accordance with ASTM D 623-58. A Goodrich type heat build-up tester was used under a load of 35 lbs, a stroke of 6.35 mm, a frequency of 1,800 rpm and a chamber temperature of 40° C. Heat build-up temperature after 40 minutes was determined by indicating the difference between the rubber temperature after 40 minutes and the initial rubber temperature.

(4) Flex Cracking Resistance

A fatigue-to-failure tester, manufactured by MONSANTO CO., was used. Flex cycles until breaking were measured under a strain ratio of 100%.

Table 4 shows compounding conditions for the modifying compounds, namely the ammonium salts of the present invention or the comparative compounds, and results of the above various tests.

TABLE 4

| | | Invention | | | | | | | |
| --- | --- | --- | --- | --- | --- | --- | --- | --- | --- |
| | | 1 | 2 | 3 | 4 | 5 | 6 | 7 | 8 |
| Modifying compound | Kind | A | B | C | D | E | F | G | H |
| | Amount (parts by weight) | 1 | 1 | 1 | 1 | 1 | 1 | 1 | 1 |
| Rubber properties | Scorch time (min) | 11.1 | 12.5 | 10.9 | 13.7 | 10.1 | 11.4 | 10.7 | 10.2 |
| | Resilience (%) | 69 | 67 | 68 | 67 | 77 | 68 | 75 | 77 |
| | Heat build-up temperature (°C.) | 33 | 37 | 35 | 38 | 28 | 34 | 30 | 28 |
| | Flex cracking (KC) | 25.8 | 21.7 | 26.2 | 20.3 | 29.1 | 22.5 | 28.7 | 29.8 |
| | $M_{300}$ (kg/cm$^2$) | 160 | 159 | 159 | 162 | 165 | 158 | 164 | 165 |

| | | Invention | | | | | | Comparison | | |
| --- | --- | --- | --- | --- | --- | --- | --- | --- | --- | --- |
| | | 9 | 10 | 11 | 12 | 13 | 14 | 1 | 2 | 3 |
| Modifying compound | Kind | I | J | K | L | E | E | DTHQ | MNDS | — |
| | Amount (parts by weight) | 1 | 1 | 1 | 1 | 0.3 | 0.5 | 1 | 1 | — |
| Rubber properties | Scorch time (min) | 13.3 | 12.5 | 10.6 | 10.1 | 12.0 | 11.2 | 2.5 | 4.2 | 16.7 |
| | Resilience (%) | 67 | 69 | 70 | 75 | 72 | 75 | 69 | 70 | 62 |
| | Heat build-up temperature (°C.) | 38 | 34 | 32 | 30 | 33 | 30 | 34 | 32 | 42 |
| | Flex cracking (KC) | 24.8 | 25.8 | 23.9 | 28.6 | 22.0 | 24.2 | 10.9 | 19.6 | 21.1 |
| | $M_{300}$ (kg/cm$^2$) | 153 | 155 | 158 | 162 | 160 | 163 | 172 | 160 | 149 |

Example 14

Using SBR #1500 instead of the natural rubber, test pieces were prepared in the same manner as in Example 13 except that the oil bath in the Bumbury's Mixer was settled at a temperature of 190° C. Evaluation tests were conducted as in the manner shown in Example 13. Table 5 shows results of the evaluation tests together with compounding conditions for the modifying compounds.

TABLE 5

|  |  | Invention | | | | Comparison | |
|---|---|---|---|---|---|---|---|
|  |  | 1 | 2 | 3 | 4 | 1 | 2 |
| Modifying compound | Kind | A | E | E | E | — | DTHQ |
|  | Amount (parts by weight) | 2 | 0.5 | 1 | 2 | — | 2 |
| Rubber properties | Scorch time (min) | 19.5 | 22.5 | 20.1 | 18.3 | 22.4 | 7.4 |
|  | Resilience (%) | 55 | 55 | 57 | 60 | 53 | 55 |
|  | Heat build-up temperature (°C.) | 60 | 61 | 57 | 53 | 65 | 57 |
|  | Flex cracking (KC) | 52.2 | 48.8 | 55.2 | 58.9 | 41.9 | 10.1 |
|  | $M_{300}$ (kg/cm$^2$) | 140 | 133 | 136 | 138 | 130 | 149 |

What is claimed is:

1. A rubber composition comprising rubber and an ammonium salt represented by the formula:

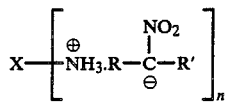

wherein X is aliphatic or alicyclic, each of which may contain halogen, oxygen, nitrogen or sulfur in the group; n is an integer of 1 or more; and R and R' each independently represent hydrogen or alkyl having 1 to 12 carbon atoms, and may conjointly form a ring.

2. The rubber composition according to claim 1, which further comprises a filler.

3. The rubber composition according to claim 2, wherein the filler is carbon black.

4. The rubber composition according to claim 1, wherein the ammonium salt is present in an amount of from about 0.1 to about 10 parts by weight per 100 parts by weight of the rubber.

5. The rubber composition according to claim 1, wherein X is an aliphatic group having 1 to 18 carbon atoms.

6. The rubber composition according to claim 5, wherein the aliphatic group has 4 to 12 carbon atoms.

7. The rubber composition according to claim 1, wherein X is an alicyclic group having 3 to 18 carbon atoms.

8. The rubber composition according to claim 7, wherein the alicyclic group has 6 carbon atoms.

9. The rubber composition according to claim 1, wherein X is an aliphatic group containing halogen, oxygen, nitrogen or sulfur in the group.

10. The rubber composition according to claim 9, wherein X is:

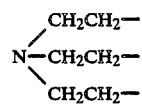

and n is 3.

11. The rubber composition according to claim 1, wherein n is an integer of 1 to 6.

12. The rubber composition according to claim 1, wherein R and R' are each independently hydrogen or alkyl having 1 to 6 carbon atoms.

13. The rubber composition according to claim 1, wherein R and R' conjointly form a ring.

14. The rubber composition according to claim 1, wherein in the rubber is selected from the group consisting of natural rubber, polyisoprene rubber, styrene-butadiene copolymer rubber, polybutadiene rubber, acrylonitrile-butadiene copolymer rubber, isoprene-isobutylene copolymer rubber and ethylene-propylene-diene copolymer rubber.

* * * * *